3,026,315
SEPARATION OF ISOTHIOCINEOLE
Alfred W. Weitkamp, Lansing, Ill., assignor to Standard Oil Company, Chicago, Ill., a corporation of Indiana
No Drawing. Filed Jan. 7, 1960, Ser. No. 957
9 Claims. (Cl. 260—96.5)

This invention relates to the separation of isothiocineole from close boiling compounds and to isothiocineole compositions thereby obtained.

Isothiocineole, as referred to herein, is the compound having the structural formula:

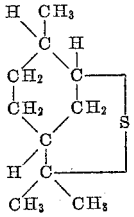

and is present, for example, in admixture with other sulfurized terpenes obtained by sulfurizing dipentene. Only the trans isomer of isothiocineole is present. In its optically active form, isothiocineole can be named either (—)2,8-trans-p-menthylene sulfide (by a special system for terpenes set out in Advances in Chemistry Series No. 14, "Nomenclature for Terpene Hydrocarbons," American Chemical Society, Washington, D. C., 1955) or (—)-4-exomethyl-7,7-dimethyl-6-thiabicyclo [3.2.1] octane (by the general ring index system of A. M. Patterson and L. T. Capell, "The Ring Index," ACS Monograph No. 84, The Reinhold Publishing Corp., New York, N. Y., 1940). Isothiocineole is a useful sulfur solvent and may be used to recover sulfur from admixture with inorganic materials.

Isothiocineole, a cyclic thioether, occurs in admixture with hydrocarbons such as p-cymene, oxygenated terpenes such as fenchone, and other cyclic thioethers in the low-boiling portion of the product from the sulfurization of dipentenes. Also occurring in the low-boiling portion of sulfurized dipentenes is a component which boils at about 4° C. below the isothiocineole boiling point and has the following structure:

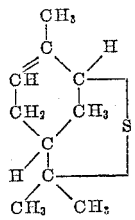

The nuclear double bond of this compound contributes color instability to an isothiocineole mixture thereby practically eliminating the use of isothiocineole from sulfurized terpenes as a commercially desirable and salable product.

I have found that isothiocineole can be separated substantially as a pure compound from the complex mixture in the low-boiling portion of sulfurized terpenes by treating the mixture with thiourea in the presence of a thiourea activator. The thiourea forms a crystalline adduct complex with the isothiocineole but does not form such a complex with any other component of the mixture and particularly does not form a crystalline complex with the close boiling component having an olefinic double bond, mentioned above. Accordingly, from about 1 to about 10 or more moles of thiourea per mole of isothiocineole, and for more complete isothiocineole recovery preferably from about 5 to about 10 moles, or for higher purity isothiocineole preferably from about 2 to about 4 moles, are added to the mixture of low-boiling sulfurized terpenes in the presence of from about 0.01 to about 1 mole of activator based on 1 mole of thiourea. The mixture is maintained at a temperature in the range of from about 0 to about 60° C. and preferably from about 25 to about 30° C. for a period sufficient to form the adduct and preferably for at least about 15 minutes. The unreacted components, i.e., those components not forming complexes, as well as any excess of thiourea and activator, are then removed from the resulting crystal slurry by filtration or centrifuging. The separated crystals are washed with a non-solvent for thiourea, such as, for example pentane, hexane, benzene, or ethyl ether. The crystalline adduct complex is believed to contain between about 2 and about 4 moles of thiourea per mole of isothiocineole.

The separated crystalline complex is then decomposed by washing with water or ethanol or other thiourea solvents at a temperature in the range of from about 25 to about 100° C. and preferably from about 40 to about 60° C. to break the complex and dissolve and remove the thiourea and activator in the thiourea solvent. The decomposition of the complex and separation of isothiocineole from thiourea may also be accomplished by vacuum distillation at a temperature between about 80 and about 140° C. or by other known means for decomposing thiourea adducts or complexes and separating isothiocineole from thiourea.

The sulfurized dipentenes are those materials obtained from the sulfurization of dipentenes or other terpenes containing dipentenes. The sulfurization may be effected by admixing free sulfur with terpenes containing dipentenes and applying heat to promote the reaction. Other methods of sulfurization include adding the sulfur to the terpene while the terpene is maintained at the high reaction temperature or by adding terpene to molten sulfur. The sulfurization of terpene is old in the art and is not particularly a part of this invention except insofar as the sulfurization of a terpene produces the isothiocineole to be separated in accordance with this invention. Although I do not intend to be held to any theories regarding the formation of isothiocineole by sulfurization of the terpene, apparently during sulfurization the isothiocineole is formed by action of sulfur on the dipentene present in the terpene, advantageously present as at least 25 weight percent of total terpene. Preferably the terpene contains at least about 50 weight percent of dipentene, such as a terpene obtained from distillation of pine stumps, or nearly pure dipentene obtained from orange peelings. Of course, other terpenes may be present in admixture with the dipentene. Such other terpenes include such compounds as terpinolene, α-terpinene, β-terpinene, γ-terpinene, 1(7),4(8)-p-menthadiene, 2,4(8)-p-methadiene, 3,8-p-menthadiene, phellandrene, β-phellandrene, 2,8-p-menthadiene, pseudolimonene, carvomenthene (1-p-menthene), dihydropentene (8-p-menthene), p-menthane, p-cymene, allo-ocimene, fenchenes, bornylenes, sesquiterpenes, diterpene, polyterpenes having the general formula $(C_5H_8)_n$, etc., and oxygeneated derivatives thereof such as terpene alcohols, and particularly dipentene (limonene) and its oxygenated derivatives. The sulfurized product of such terpenes containing isothiocineole as a low boiling component among other low boiling components is advantageously taken from the sulfurization products of the terpenes as a low-boiling overhead by-product, boiling at from about 170 to about 220° C. The low-boiling fraction may develop inhibitors for the formation of the thiourea complex. However, these inhibitors are relatively non-volatile and can be removed as a residue by vacuum distillation. The amount of isothiocineole present in the low-boiling fraction depends on the original dipentene content and varies in the range of from about 20 to about 50 weight percent and usually from about 40 to about 50 weight percent. The amount of thiourea used to form the complex should be approximated on this basis and then recalculated for a given sulfurized terpene on the basis of the yield of crystalline complex formed by treatment with the thiourea.

Suitable thiourea activators may be chosen from the class including water and various oxygenated organic compounds, such as alcohols, aldehydes, ketones, and the like. Among the organic activators, especially advantageous are the aliphatic monohydric alcohols, aliphatic aldehydes and aliphatic ketones. The preferred activators are water, methanol, acetone, ethanol, n-propyl alcohol and isopropyl alcohol. However, numerous other oxygenated organic compounds including 1-octanol, 2-ethyl-1-hexanol, n-dodecyl alcohol, methyl-n-amyl ketone, amyl acetate, ethyl ether, and others are successfully employed as thiourea activators.

As a typical example of the isothiocineole separation process, sulfurized terpene is filtered, washed and stripped to obtain a light-ends crude overhead fraction boiling below about 220° C. The crude overhead is vacuum distilled until about 90 to 95% is taken overhead, leaving about 5 to 10% as a residue. One hundred gallons of the distilled overhead are charged to a reaction vessel and 800 pounds of thiourea and 10 gallons of methanol are added and the resulting mixture is diluted with 100 gallons of hexane and agitated by stirring to mix the reactants completely. A thick slurry is formed and stirred intermittently for about 3 hours. The slurry is transferred to a filter. The hexane phase containing non-adducted components is drawn off and 200 gallons of additional hexane are charged to the reaction chamber to suspend the adduct. The suspension is then heated to boiling and filtered and 200 gallons of hexane are again added. The hexane phase containing additional non-adducted components is again filtered from the slurry. After the separation of the hexane phase, 1000 gallons of water are added to the adduct to dissolve the thiourea. The dissolved thiourea is removed by decantation and the resulting product is washed with 50 gallons of water and dried.

In accordance with my invention, the following specific examples are offered as illustrations of the separation of isothiocineole from other close boiling constituents with which it occurs.

REMOVAL OF INHIBITORS FROM SULFURIZED DIPENTENE

In order to assure the removal of any adduction inhibitors from the sulfurized terpene used in some of the examples below, crude overhead boiling below about 220° C. from the fractionation of sulfurized dipentene (obtained from sulfurization of a commercial dipentene) was vacuum distilled until 92% was taken overhead as a refined sulfurized dipentene starting material for the examples, leaving 8% as a residue.

Example I

A 100 gram sample of the refined sulfurized dipentene was stirred in a container with 100 grams (4 moles of thiourea per mole of isothiocineole) of thiourea and 10 ml. of methanol. The resulting thick slurry was diluted with 100 ml. hexane and stirred intermittently for about 3 hours. About 200 ml. of hexane were added at room temperature and the resulting slurry was filtered. About 200 ml. of additional hexane were then added to the extract and the resulting adduct slurry was heated to boiling for 5 minutes and filtered. The adduct extract from the filtration was again washed with 200 ml. of hexane and the raffinate was again filtered from the resulting slurry. The resulting extract was added to about 1000 ml. of water to dissolve out the thiourea. The isothiocineole was separated from the solution of water and thiourea by decantation, washed with 50 ml. of water and dried by shaking with anhydrous sodium sulfate. The extract weighed 41.3 grams and contained 38.4 grams (93 weight percent) of isothiocineole. The raffinates collected from the above hexane washings were collected and the hexane was distilled off. After removal of the hexane, the raffinate yielded 57.5 grams.

Example II

The procedure of Example I was repeated using a 100 g. sample of crude sulfurized dipentene in lieu of the refined sulfurized dipentene starting material. Raffinate yield was 74 grams and extract yield was 21 grams.

The yield of Example II, in comparison with the higher yield of Example I, demonstrates the presence of adduction inhibitors which preferably should be removed before the adduct forming step.

Examples III Through V

In Examples III through V, the procedure of Example I was followed varying amounts of methanol present with refined sulfurized dipentene and thiourea charged to the process as indicated in Table I. The results from Examples I, III, IV, and V are listed in Table I below.

TABLE I

| Example | Methanol, ml. | Refined Sulfurized Dipentene, g. | Thiourea, g. | Raffinate, g. | Extract, g. |
|---|---|---|---|---|---|
| I | 10 | 100 | 100 | 57.5 | 41.3 |
| III | 100 | 100 | 100 | 75 | 25 |
| IV | 50 | 100 | 100 | 70 | 30 |
| V | 20 | 100 | 100 | 67 | 31 |

Example VI

The procedure of Example I was repeated using the same amounts of reagents with the exception that only 3 ml. of methanol activator were used. After one-half hour no adduct formed; therefore, 7 ml. more of methanol were added and the adduct was formed. The procedure was continued and final yield was 28 grams having an isothiocineole content of 95 weight percent.

The results of Example VI, indicating lower yield compared with Example I, demonstrate that, as in other thiourea adduction reactions, sufficient activator should be used to provide ease of adduct formation. From Example VI and other experiments, it has been determined that advantageously from 4 to 50 weight percent activator based on thiourea should be used and preferably about 10 weight percent activator based on thiourea.

From experiments with separated isothiocineole, it was found that the crystalline adduct complex contained roughly 50 grams of isothiocineole for each 100 grams of thiourea. Generally, the thiourea was not completely utilized and the efficiency of its utilization depended upon the relative amount of isothiocineole present. On the basis of a theoretical amount of 50 grams of isothiocineole per 100 grams of thiourea in the complex, Examples VII through IX were run varying the theoretical proportion of isothiocineole in the feed to thiourea added for adduction.

Examples VII Through IX

In Examples VII through IX the procedure of Example I was followed using the amounts of methanol, refined sulfurized dipentene and thiourea set out in Table II with the results listed in Table II, below. The amounts of refined sulfurized dipentene are set out with regard to the amount of isothiocineole contained therein.

TABLE II

| Example | Charge | | | Yield of Extract, g. | Isothiocineole Present in Extract | |
|---|---|---|---|---|---|---|
| | Methanol, ml. | Feed Containing g. of isothiocineole | Thiourea, g. | | g. | weight percent |
| VII | 10 | 150 | 100 | 54 | 52 | 96 |
| VIII | 10 | 120 | 100 | 41 | 38 | 93 |
| IX | 10 | 80 | 100 | 37 | 32 | 86 |

The above Examples VII–IX demonstrate that isothiocineole of a purity of at least 85 weight percent and up to more than 95 weight percent may be separated from close boiling components in accordance with this invention. Further, based on the above examples, it can easily be seen that for highest purity an excess of isothiocineole should be used, for most complete recovery an excess of thiourea should be used.

The structure of the isothiocineole was established by the procedure set out by A. W. Weitkamp in the Journal of the American Chemical Society, vol. 81, pages 3430 to 3439 (July 5, 1959). In accordance therewith, determination of the structure of the isothiocineole required identifying the carbon skeleton and locating both of the carbon to sulfur bonds. Mass spectrometry established that the empirical formula for the isothiocineole was $C_{10}H_{18}S$ and that the compound was, therefore, a saturated bicyclic sulfide. A fragment ion that had a mass corresponding to $C_3H_7S+$ occurred in the spectrum of the compound and indicated that one of the carbon to sulfur bonds was from the isopropyl group to the sulfur. An infrared spectrum was taken. The infrared spectrum had bands at 7.25 to 7.35 microns that clearly showed the presence of the single methyl group and the two methyls of the isopropyl group. Accordingly, these three methyl groups were not directly linked to the sulfur and sulfur could only be joined to the isopropyl group at the tertiary carbon atom. Although the presence of several bands in the infrared spectrum in the region of 15 to 20 microns suggested that both tertiary and secondary sulfide linkages might be present, correlations were not as firm.

Thiourea readily forms a crystalline adduct with the isothiocineole, as illustrated above. Scale models of the possible configurations of the empirical formula, in view of the findings from the above spectra, were constructed from Stuart and Briegleb atom models. Only the cross section of the saturated molecule set out above as the structural formula for isothiocineole (5.7 x 6.5 A.) was small enough to enter the 5.8 x 6.8 A. channels of the thiourea adduct lattice.

The optical purity of the isothiocineole was studied with the aid of thiourea adduction to eliminate traces of close-boiling impurities. The maximum rotation obtained by repeated adduction was —59.9°. The melting point was —7.85° C. and the cryoscopic behavior indicated purity of 87±5%. Four recrystallizations from isopentane increased the rotation to —67.1°, the melting point to —3.88° and the purity to 99+%. The thiourea adducted product therefore contained about 6.5% of the dextrorotatory isomer or 13% of the racemate.

Isothiocineole is an effective sulfur solvent and may be used to recover sulfur from admixture with inorganic materials such as sulfur mined from deposits associated with limestone, calcite, gypsum, anhydrite and/or carbonaceous matter in the form of petroleum or bitumen. Accordingly, the mined sulfur is extracted by washing with isothiocineole and the sulfur is thereby recovered from admixture with inorganic materials. The sulfur may be removed from the isothiocineole solvent, for example, by contacting with a mineral oil which causes precipitation of the sulfur. Further, isothiocineole may be used directly to extract sulfur from deposits, such as surface deposits, in situ.

Regarding desirability of product in comparing the isothiocineole with the crude thioether fraction from which it is recovered, I have found that the crude thioether fraction lacks color stability. Under normal indoor storage conditions, the thioether fraction becomes yellow within a few days and generally after standing for about a week is entirely unsuitable from the standpoint of desirable color. On the other hand, the isothiocineole is color stable and retains its brightness even after a year or more of storage.

It is evident from the foregoing that I have provided a process for separating isothiocineole from other close boiling compounds and that the products provided in accordance herewith may contain more than about 90% isothiocineole and up to about 99% or more isothiocineole by weight.

I claim:

1. The process of separating isothiocineole having the structural formula:

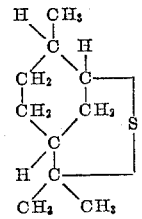

from admixture with close boiling products from the sulfurization of terpenes which process comprises contacting the mixture of said isothiocineole and close boiling products with from about 1 to about 10 mols of thiourea per mol of isothiocineole at a temperature in the range of from about 0° C. to about 60° C. whereby a solid adduct of thiourea and said isothiocineole is formed, separating said adduct from said mixture, and separating thiourea from said adduct.

2. The process for separating isothiocineole having the structural formula:

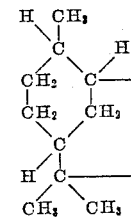

from a fraction of sulfurized dipentene boiling below about 220° C. which process comprises contacting said fraction with an activator for thiourea and from about 2 to about 4 moles of thiourea per mole of isothiocineole in said fraction at a temperature in the range of from about 0 to about 60° C. whereby a solid crystalline adduct of thiourea and isothiocineole is formed, separating said adduct from the liquid portion of said fraction, separating said adduct into isothiocineole and thiourea and recovering said isothiocineole.

3. The process of claim 2 wherein the contacting is with from 4 to 50 weight percent of said activator based on thiourea.

4. The process of claim 2 wherein said activator is methanol.

5. The process of claim 2 wherein said contacting is at a temperature in the range of from about 25 to about 30° C.

6. The process of claim 2 wherein the close boiling products include the compound having the formula:

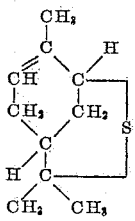

7. The process for separating isothiocineole having the structural formula:

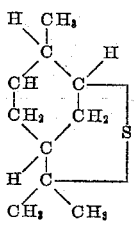

from a fraction of sulfurized dipentene boiling below about 220° C. which process comprises vacuum distilling said fraction whereby non-volatile materials are removed, contacting said fraction with methanol and from about 5 to about 10 moles of thiourea per mole of isothiocineole in said vacuum distilled fraction at a temperature in the range of from about 25 to about 30° C. whereby a solid crystalline adduct of thiourea and isothiocineole is formed, separating said adduct from the liquid portion of said fraction, extracting thiourea from said adduct to liberate said isothiocineole from said adduct and recovering said isothiocineole.

8. As a composition of matter, a sulfurized dipentene fraction consisting essentially of sulfurized dipentene and containing at least about 85% and less than 100% by weight of the isothiocineole having the following structural formula:

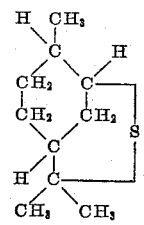

9. As a composition of matter, a solid crystalline adduct of thiourea and isothiocineole.

References Cited in the file of this patent
UNITED STATES PATENTS
2,746,948    Fetterly _____ May 22, 1956